United States Patent
Sheerin et al.

(10) Patent No.: US 7,754,801 B2
(45) Date of Patent: Jul. 13, 2010

(54) TRANSLUCENT COATING COMPOSITIONS PROVIDING IMPROVED UV DEGRADATION RESISTANCE

(75) Inventors: Robert J. Sheerin, North Caldwell, NJ (US); Navin Tilara, Roseland, NJ (US); Hrire Gharapetian, Ridgewood, NJ (US); David L. Siegfried, Langhorne, PA (US)

(73) Assignee: Columbia Insurance Company, Omaha, NE (US)

( * ) Notice: Subject to any disclaimer, the term of this patent is extended or adjusted under 35 U.S.C. 154(b) by 1039 days.

(21) Appl. No.: 11/323,616

(22) Filed: Dec. 30, 2005

(65) Prior Publication Data
US 2007/0155886 A1 Jul. 5, 2007

(51) Int. Cl.
C08K 3/22 (2006.01)
(52) U.S. Cl. ................ 524/432; 524/435; 524/236; 524/556; 524/555; 524/571
(58) Field of Classification Search ............ 524/432, 524/435, 236, 556, 555, 57, 571
See application file for complete search history.

(56) References Cited

U.S. PATENT DOCUMENTS

| | | | |
|---|---|---|---|
| 4,031,055 | A | 6/1977 | Dupont et al. |
| 4,331,706 | A | 5/1982 | Kindrick |
| 4,799,963 | A | 1/1989 | Basil et al. |
| 5,415,690 | A | 5/1995 | Watanabe |
| 5,635,548 | A | 6/1997 | Kittle |
| 6,020,419 | A | 2/2000 | Bock et al. |
| 6,048,910 | A | 4/2000 | Furuya et al. |
| 6,187,438 | B1 | 2/2001 | Chopin |
| 6,197,101 | B1 | 3/2001 | Matsumura et al. |
| 6,214,416 | B1 | 4/2001 | Sakagami |
| 6,264,859 | B1 | 7/2001 | Basil |
| 6,271,292 | B1 | 8/2001 | Mager |
| 6,497,964 | B1 * | 12/2002 | Matsumura et al. ......... 428/447 |
| 6,627,180 | B2 | 9/2003 | Candau |
| 6,667,360 | B1 | 12/2003 | Ng |
| 6,726,997 | B2 | 4/2004 | Tamori |
| 6,756,124 | B2 | 6/2004 | Kanamori |
| 6,790,273 | B2 | 9/2004 | Mager |
| 6,818,050 | B1 | 11/2004 | Nyssen |
| 6,846,572 | B2 | 1/2005 | Yamaguchi |
| 2001/0031867 | A1 * | 10/2001 | Gupta et al. ................ 544/215 |
| 2001/0055671 | A1 | 12/2001 | Pickett |
| 2002/0007006 | A1 | 1/2002 | Kanamori |
| 2003/0073779 | A1 | 4/2003 | Tamori et al. |
| 2003/0077459 | A1 | 4/2003 | Vitt |
| 2003/0091824 | A1 | 5/2003 | Kim |
| 2003/0176551 | A1 | 9/2003 | Rediske |
| 2003/0192457 | A1 | 10/2003 | Mager |
| 2004/0110012 | A1 | 6/2004 | Bier |
| 2004/0156986 | A1 | 8/2004 | Tadav |
| 2004/0254282 | A1 | 12/2004 | Suzuki |
| 2005/0070623 | A1 | 3/2005 | Takase et al. |
| 2005/0126440 | A1 | 6/2005 | Baldi et al. |

FOREIGN PATENT DOCUMENTS

| | | |
|---|---|---|
| CN | 1412258 | 4/2003 |
| EP | 0732356 A2 | 9/1996 |
| JP | 2000319128 | 4/1999 |
| WO | WO 0193822 | 12/2001 |

OTHER PUBLICATIONS

Masui, et al. *Synthesis of BN-coated CeO SUB 2 Fine Powder as a New UV Blocking Material.* Journal of Materials Chemistry, vol. 10, No. 2, 2000, pp. 353-357. (Abstract Only).
Masui, et al. *Synthesis of BN-coated CeO SUB 2 Fine Powder as a New UV Blocking Material.* Shikizai Kyokaishi (Journal of the Japan Society of Colour Material) vol. 73, No. 9, 2000, pp. 429-433. (Abstract Only).
Yamamoto, et al. *Development of a BN-Coated Ceria-Based UV Blocking Material.* Kidorui (Rare Earths), No. 36, 2000, pp. 86-87. (Abstract Only).
Masui, et al. *Synthesis of a Ceria-Based UV Blocking Material.* Kidorui (Rare Earths), No. 34, 1999, pp. 60-61.
*ChemFiles: Nanomaterials for Advanced Applications.* Sigma-Aldrich Corp., vol. 5, No. 3, p. 5. http://saj.ds-navi.co.jp/~saj/aldrich/materialscience/pdf/ChemFile5-3.pdf. (Abstract Only).
Fauchadour, et al. *Application to Coatings Technologies.* Paint and Coatings Industry, Aug. 2005, pp. 88-93.
*The Nanofine Zinc Oxide for Transparent Long Lasting Industrial UV Protection.* http://www.advancednanotechnology.com/nanoz.php.
*The Nanofine Zinc Oxide for Transparent Long Lasting UV Protection in Industrial Coatings.* www.advancednanotechnology.com.
*Nanomaterials Applications: UV Attenuating Coatings—Nanophase Technologies.* http://www.nanophase.com/applications/uv-attenuating_coatings.asp.
Fauchadour, et al. *Nanoparticles of Cerium Oxide: Application to Coatings Technology.* Conference Paper, Proc. PRA 'Nano and Hybrid Coatings' Conference, Manchester, 2005, Paper 19. (Abstract Only).

(Continued)

*Primary Examiner*—David Wu
*Assistant Examiner*—Michael M Bernshteyn
(74) *Attorney, Agent, or Firm*—The H.T. Than Law Group

(57) ABSTRACT

The present invention relates to substrates and coating compositions disposed thereon containing improved ultraviolet degradation resistance. Specifically, these coating compositions can contain multiple UV protectants and can advantageously be used in transparent, semi-transparent, and/or translucent coatings on substrates, particularly opaque or semi-opaque substrates such as wood, e.g., in order to inhibit, to reduce, and/or to minimize UV degradation of said substrates.

29 Claims, No Drawings

OTHER PUBLICATIONS

Pacaud, et al. *Nano-tatania as Ultraviolet Blockers in Stains*. European Coatings Journal, 842, No. 11, 1998. (Abstract Only).

Thayer, *Nanomaterials: Large Chemical and Materials Companies Target Small Nanotechnology Firms for Venture Investing, Collaborations, and Product Innovation*. Chemical and Engineering News, vol. 81, No. 35, Sep. 1, 2003. http://pubs.acs.org/cen/coverstory/8135/8135nanotechnology.html.

"Hindered Amine Stabilizers," UV/Light Stabilizers Center, www.specialchem4adhesives.com.

International Search Report and Written Opinion issued in connection with international application No. PCT/US06/49054 on Sep. 16, 2008.

* cited by examiner

US 7,754,801 B2

TRANSLUCENT COATING COMPOSITIONS PROVIDING IMPROVED UV DEGRADATION RESISTANCE

FIELD OF THE INVENTION

The present invention relates to substrates and coating compositions disposed thereon containing improved ultraviolet degradation resistance. The coating compositions according to the invention can form transparent, semi-transparent, and/or translucent coatings on substrates to reduce ultraviolet degradation of the substrates.

BACKGROUND OF THE INVENTION

Compounds for reducing ultraviolet degradation of a variety of substrates are known and have been used in many fields, including topical skin creams, eyeglass and window coatings, and the like. These compounds can be organic or inorganic in nature. For example, transparent iron oxides, also known as trans-oxides, have been used in paints and stains.

In one example, U.S. Pat. No. 6,818,050 B1 discloses the use of oxides, including transparent oxides, along with at least one organic or inorganic white, black, or chromatic pigment such as zinc oxide, in lacquers, paints and other coating systems. Zinc oxide can be used for different purposes, depending upon the particle size of the zinc oxide. Zinc oxide is a known white pigment when used in paints, sunscreens, and architectural coatings, but these zinc oxide particles typically include relatively large particles that impart a white color to a composition.

On the other hand, other metal oxides, e.g., cerium oxide particles, when possessing a relatively small particle size, do not generally impart a white color to a composition and have recently been used as UV protectants in coatings and bulk materials. For instance, European Patent Application No. EP 0 732 356 A2 discloses acrylic coatings on a thermoplastic substrate containing cerium oxide as an inorganic UV light absorber. This publication also discloses that the cerium oxide can be added as an aquasol or an organosol to an acrylic primer to protect the thermoplastic substrate.

Similarly, U.S. Pat. No. 6,790,273 B1 discloses compositions comprising inorganic UV absorbers including nano-$CeO_2$ to protect materials such as plastics from photochemical degradation. This patent also discloses that the compositions contain more than 15% nano-$CeO_2$. This patent further discloses the use of these nano-$CeO_2$ particles in combination with polyfunctional organosilanes and polymers made therefrom.

There are several publications in the patent literature that describe combinations of metal oxides with organosilanes and/or polymers made therefrom, including reaction products of organosilanes and metal oxides, such as organosilane-grafted metal oxides. For example, U.S. Pat. No. 6,264,859 B1 discloses optically transparent UV-protective coatings comprising cerium oxide in an inorganic oxide matrix formed by the hydrolysis and condensation of an organoalkoxysilane and/or other metal alkoxide, in combination with the reaction product of cerium oxide and tetraalkylsilicate.

U.S. Pat. No. 6,846,572 B1 discloses compositions used to form coatings in which a metal oxide bonded to a silanol-containing or silanol-forming group is used in combination with a melamine compound to form a cured product or laminate. Other similar patent publications include U.S. Patent Application Publication Nos. 2003/0073779 A1 and 2004/0254282 A1, as well as U.S. Pat. Nos. 6,214,416 B1 and 6,756,124 B1. For instance, U.S. Patent Application Publication No. 2003/0073779 A1 discloses an aqueous dispersion and coated product produced therefrom containing a metal oxide and an organosilane or a hydrolysate of an organosilane, as well as other components.

In some cases, combinations of components can be found to have increased effect when combined under certain circumstances. For instance, U.S. Pat. No. 6,627,180 B1 to L'Oreal describes a topically applicable cosmetic/dermatological sunscreen composition containing mixed UV-photoprotecting screening agents.

However, in architectural coating applications, such as for use with paints and stains, there remains a need involving industrial coatings to increase the UV-protective ability of coating compositions.

BRIEF SUMMARY OF THE INVENTION

The present invention is directed to a coating composition to protect a substrate from ultraviolet degradation.

In one aspect, the UV protectant composition comprises a latex emulsion containing polymeric particles, a first UV protectant and a second UV protectant. The first UV protectant can be UV-protective zinc oxide particles or UV-protective cerium oxide particles, or both. The second UV protectant can be a transparent non-oxide or a hindered amine light stabilizer, or both. The hindered amine light stabilizer may be combined with an organic UV absorber.

In another aspect, the UV protectant composition is a translucent composition. This translucent composition contains a latex emulsion comprising polymeric particles and the first UV protectant, described above.

In another aspect of the present invention, a UV protectant composition contains a latex composition containing polymeric particles and at least three UV protectants.

The UV protectant composition may be transparent or translucent. The coating on the substrate formed from the UV protectant composition can be transparent or translucent. The substrate to be coated preferably includes but not limited to woods, ceramic (bricks), cement, polymeric based substrates, and the like, and also includes architectural surfaces. The substrate can also be substantially opaque.

The majority of the polymeric particles in the latex emulsion can be acrylic monomer repeat units in one or more embodiments of the present invention.

DETAILED DESCRIPTION OF THE INVENTION

The present invention relates generally to coating compositions, layers made from those coating compositions, and substrates coated with one or more of those layers, which contain, among other things a combination of at least two UV protectants, preferably a synergistic combination. The present invention also relates to UV-protective latex compositions.

The coating compositions according to the invention can protect a substrate from degradation by ultraviolet radiation. Examples of UV protectants used in these compositions can include, but are not limited to UV scavengers, UV absorbers, transparent oxides, UV protective oxides, those compounds sold by Ciba Chemicals under the trade name Tinuvin™, and combinations thereof. UV scavengers can include, but are not limited to, hindered amine light stabilizers (HALS). UV absorbers can include, but are not limited to, hydroxybenzophenones, hydroxyphenylbenzotriazoles, oxalanilides, hydroxyphenyltriazines, and the like, and combinations thereof. Transparent oxides can include, but are not limited to, transparent yellow iron oxides, transparent red iron oxides, those oxides commercially available under the trade names Timbasol™ PW 895 and Timbasol™ PW 896 from CIUPL of Mumbai, and the like, and combinations thereof. UV-protective oxides can include, but are not limited to UV-protective zinc oxides, UV-protective cerium oxides, those oxides sold by Byk Chemie under the trade name BYK LP™ X), those oxides sold under the trade name Nyacol™ DP5370 by Nyacol Nano Technologies, Inc., and the like, and combinations thereof. Particularly in translucent and/or transparent compositions such as stain compositions, it may be desirable for any UV protectants present to impart, and/or not to destroy any existing, transparent and/or translucent qualities to/of the composition.

As used herein, a "UV-protective oxide" is an oxide having the primary purpose to inhibit, to reduce, and/or to minimize degradation of a substrate by ultraviolet radiation. For example, the metal oxide UV protectants have similar chemical structure to metal oxides that are used as pigments. Nevertheless, metal oxides (such as the transparent/translucent iron oxides, the UV-protective zinc oxides, the UV-protective cerium oxides, and the like) that are formulated and dimensioned to function primarily as UV protectants and/or that are formulated and dimensioned differently than conventional metal oxide pigments, are classified herein as UV-protective oxides and not as pigments. Without wishing to be bound by any theory, it is believed that UV-protective oxides have a particle size distribution in which substantially, if not all, of the oxide particles and aggregates have dimensions that are smaller than a wavelength of visible light, e.g., not more than about 400 nm, preferably not more than about 380 nm, so as not to significantly affect the path and/or intensity of light. Indeed, the UV-protective oxides discussed herein have alternately been called nano-oxides by others in the relevant technical areas. For instance, micron-sized zinc oxides or slightly smaller, for example, are typically formulated as a conventional white pigment, while UV-protective zinc oxides are formulated primarily as UV protectants.

In one embodiment, the UV protectants in compositions according to the invention can comprise a combination of a transparent oxide (trans-oxide) and a UV-protective oxide (e.g., UV-protective zinc oxide, UV-protective cerium oxide, or a combination thereof). The trans-oxide, in some embodiments, can include, but is not limited to, a yellow trans-oxide, a red trans-oxide, or a combination thereof.

In another embodiment, the UV protectants in compositions according to the invention can comprise a combination of an organic compound having at least three nitrogens in a $C_5$-$C_7$ ring structure and a UV-protective oxide (e.g., UV-protective zinc oxide, UV-protective cerium oxide, or a combination thereof). The organic compound having at least three nitrogens in a $C_5$-$C_7$ ring structure, in some embodiments, can include, but is not limited to, one or more compounds commercially available from Ciba Chemicals under the trade name Tinuvin™. The organic compound having at least three nitrogens in a $C_5$-$C_7$ ring structure, in other embodiments, can include, but is not limited to, a bis(1,2,2,6,6-pentamethyl-4-piperidinyl)sebacate, an alkyl 1,2,2,6,6-pentamethyl-4-piperidinyl-sebacate, ω-hydroxy-α-(3-(3-(2H-benzyotriazol-2-yl)-5-(1,1-dimethylethyl)-4-hydroxyphenyl)-1-oxopropyl), or a combination thereof.

In still another embodiment, the UV protectants in compositions according to the invention can comprise a combination of an organic compound having at least three nitrogens in a $C_5$-$C_7$ ring structure, a transparent oxide (trans-oxide), and a UV-protective oxide.

In most embodiments in which a UV-protective oxide is used as a UV protectant, it is preferred that the UV-protective oxide be present in a coating composition according to the invention in an amount of less than 10% by weight, or alternately in an amount of less than 10 parts per hundred of the polymer particles in the latex (hereinafter, "phr" or parts per hundred of resin). In some embodiments in which a UV-protective oxide is used as a UV protectant, the UV-protective oxide can advantageously be present in coating compositions according to the invention in amounts between about 0.1% and less than 10% by weight (or 0.1-<10 phr), preferably from about 0.3% to about 9% by weight (or 0.3 to 9 phr), for example from about 0.5% to about 8% by weight (or 0.5 to 8 phr).

In one preferred embodiment, the coating composition according to the invention can be substantially free from organosilane compounds/components/reactants (including functional organosilanes, e.g., organic silanol compounds, organoalkoxysilanes, and the like). Nevertheless, even where a coating composition contains substantially no organosilanes, it may still include silicon-containing (e.g., polysiloxane (co)polymeric) defoamers, as well as other silicon-containing compounds/components/reactants, which are not considered herein to be classified as organosilanes.

The coating composition can be transparent, translucent or semi-transparent. As used herein, the term "transparent," in reference to substrates, coatings, compositions that are made into coatings, and the like (hereinafter referred to generally as coating(s), without intent to limit), including but not limited to solid and/or liquid states, means that the coating has an average transmittance of visible light (e.g., between about 380 nm and about 770 nm or alternately between about 400 nm and about 700 nm) of at least about 40%, preferably at least about 50%, more preferably at least about 60%. The average transmittance referred to herein is typically measured for incident light normal (i.e., at approximately 90°) to the plane of the coating and can be measured using any known light transmission apparatus and method, e.g., a UV-Vis spectrophotometer. Also included are transparent compositions that form non-transparent coatings, and transparent coatings that form from any composition.

As used herein, the terms "translucent" and "semi-transparent," in reference to substrates, coatings, compositions that are made into coatings, and the like (hereinafter referred to generally as coating(s), without intent to limit), including but not limited to solid and/or liquid states, mean that the coating has an average transmittance of visible light (e.g., between about 380 nm and about 770 nm or alternately between about 400 nm and about 700 nm) of at least about 10%, preferably at least about 20%, more preferably at least about 30%. Also included are translucent/semi-transparent compositions that form non-translucent/non-semi-transparent coatings, and semi-transparent/translucent coatings that form from any composition.

Hence, as used herein, a "translucent" or "semi-transparent" coating composition encompasses conventionally translucent coating compositions as well as transparent coating compositions. In addition, the translucency/transparency of the coating compositions can be measured for one or more applications of a coating only, although the composition is applied on a substrate for testing.

As mentioned above, the coating compositions according to the invention can be made into coating layers or films, which are typically applied to/disposed on a substrate. Examples of substrates can include, but are not limited to: wood, including natural wood, compressed particulate wood, faux or artificial wood, wood composites, and the like, and combinations thereof; metals, including metal alloys, metal composites, coated metals, metallic surfaces, and the like, and combinations thereof; ceramics, including metal oxides, metal nitrides, metal oxynitrides, metal sulfides, metal carbides, and the like, and combinations thereof; transparent and/or translucent substrates such as glasses, polycarbonates, acrylics, styrenics, and the like, and combinations thereof; polymers; woven and/or non-woven fabrics; chalky substrates; building materials such as sheet rock; and the like; and combinations thereof. Typically, the substrates can be opaque, or can be at least non-transparent and/or non-translucent. For example, when the acrylic latex is used in a stain composition, the substrate can typically be wood or the like.

In the embodiments according to the present invention, the substrate is typically inanimate, i.e., a substrate does not include any portion of an animal (such as its skin, hair, eyes, etc.), but may include one or more portions of a plant (e.g., wood).

In another embodiment, the substrate on which the coating is disposed can be opaque or semi-opaque. As used herein, the terms "opaque" and "semi-opaque," with respect to an object, means that the object, prior to any coating or treatment, has an average transmittance of visible light (e.g., between about 380 nm and about 770 nm or alternately between about 400 nm and about 700 nm) of less than about 10%, preferably less than about 5%, for example less than about 2%.

In a number of embodiments of the present invention, a substrate coating composition contains polymer particles in a latex emulsion. The polymer particles according to the invention are typically polymerized in a latex system comprising water, a surface-active agent, the desired monomer(s), an initiator, optionally an organic solvent, optionally a pH adjustor, optionally a devolatilization agent, and optionally a preservative, which can be added at various times.

Examples of surface-active agents useful in the compositions according to the invention can include, but are not limited to, wax emulsions (e.g., polyethylene, paraffin, and/or oligoethylene emulsions, sold under the tradename Michem™ Emulsion 62330 by Michelman, Inc.); wetting agents (e.g., dialkyl sulfosuccinate salts such as those sold under the tradename Aerosol™ OT from Cytec); nonionic and/or anionic surfactants (e.g., such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, and those compounds sold under the trade names Triton™ from Dow Chemical, and Rhodapon™, Rhodapex™, Rhodacal™, and Rhodafac™, all from Rhodia; and the like, and combinations thereof.

Examples of initiators and devolatilization solutions useful in the compositions according to the invention can include, but are not limited to, ammonium persulfate, sodium persulfate, redox systems such as sodium hydroxymethanesulfinate (sodium formaldehyde sulfoxylate) and t-butyl-hydroperoxide, and the like, and combinations thereof, typically in an aqueous solution. Either or both of these components can optionally contain an additional surface-active agent and/or a pH adjustor, if desired to stabilize the emulsion.

Examples of pH adjustors useful in the compositions according to the invention can include, but are not limited to, ammonium hydroxide, sodium nitrite, ammonia, sodium bicarbonate, sodium carbonate, and the like, and combinations thereof. In certain cases, compounds that qualify as pH adjustors can be added for purposes other than adjusting pH, e.g., emulsion stabilization, and yet are still characterized herein as pH adjustors.

Examples of coalescence solvents and organic solvents useful in the compositions according to the invention can include, but are not limited to, alkyl ethers of alkylene glycols (e.g., 2-ethylhexyl ether of ethylene glycol, sold as Eastman™ EEH solvent from Eastman Chemical), alkyl carbitols such as methyl carbitol, alkylene glycols (e.g., propylene glycol, ethylene glycol, and the like, and combinations thereof), fatty acid alkylene glycol monoesters (e.g., those compounds sold under the tradename Archer RC™ from Archer Daniels Midland), optionally-alkyl-substituted alkanediol organic carboxylic acid monoesters (e.g., 2,2,4-trimethyl-1,3-pentanediol monoisobutyrate and those compounds sold under the tradename Texanol™ from Eastman Chemical) and the like, and combinations thereof.

Examples of biocides/preservatives useful in the compositions according to the invention can include, but are not limited to, bis(2-ethyl-1-hexyl)sulfosuccinate salts such as the sodium salt, non-metallic biocides such as those commercially available from Troy Corp. under the tradename Polyphase™ AF, hydroxy-functional azadioxabicyclo compounds such as those commercially available from ISP under the tradename Nuosept™ 95.

In some embodiments, the acrylic polymer particles do not contain any crosslinking monomers or crosslinking agents. This is at least partially due to the fact that the polymer particles according to the invention are typically polymerized in a latex system, which can either stand alone or which can then be combined with other components to form compositions for particular applications. In other embodiments, the acrylic polymer particles may be crosslinked or may contain crosslinking monomers and/or crosslinking agents.

In one embodiment, the latex containing the polymer particles can be used as part of a stain composition, e.g., for coating substrates such as wood. In another embodiment, the latex containing the polymer particles can be used as part of a two-pack acrylic-epoxy coating package useful, for example, in architectural coatings and paint formulations. In another embodiment, the latex can also be combined with one or more colorant compositions in hydrophobic latexes.

Whether in combination with a crosslinking composition, in paint or stain compositions, or by itself, the acrylic latexes useful in the invention are typically applied to a substrate, as described above.

In another aspect of the invention, the polymeric latex can be included in a coating composition, which can advantageously be an emulsion further containing water, a coalescence solvent, optionally a pH adjustor, a surface-active agent, a defoamer, at least two UV protectants, optionally a pigment, optionally a dispersant, optionally but preferably a rheology modifier, and optionally but preferably a biocide or preservative.

Examples of defoamers useful in the compositions according to the invention can include, but are not limited to, polysiloxane-polyether copolymers such as those sold by Tego under the trade name Foamex™, those sold by Byk Chemie under the tradename BYK™, those sold under the trade name Drewplus™ from Ashland Specialty Chemical, those sold under the trade name Surfynol™ from Air Products, those sold under the trade name Foamaster™ from Cognis, and the like, and combinations thereof.

Examples of dispersants useful in the compositions according to the invention can include, but are not limited to, 2-amino-2-methyl-1-propanol, hydrophobic copolymers such as Tamol™ 165A from BASF, and combinations thereof.

Examples of rheology modifiers useful in the compositions according to the invention can include, but are not limited to, those commercially available from Rohm & Haas under the trade name Acrysol™ (e.g., Acrysol™ RM-2020 NPR, Acrysol™ RM-825, and the like, and combinations thereof) and the like.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, talc, clays, nepheline, syenite, titanium oxides, zinc oxides, and the like, and any combination thereof. These exemplary color pigments can be added as powders, but can more conveniently be added as aqueous dispersions to paint compositions according to the invention. Stain compositions typically do not comprise pigments, especially if the stain compositions are desired to be transparent and/or translucent, but the incorporation of pigments into stain compositions according to the invention, while less preferable in some embodiments, is not prohibited.

Additionally or alternately, extender pigments/colorants can be added, e.g., to the grind composition portion of paint compositions. Examples of extender pigments/colorants useful in paint compositions can include, but are not limited to, silica, silicates, carbonates such as calcium carbonates, and the like, and combinations thereof.

The coating compositions containing the latex polymer particles according to the invention can advantageously exhibit a viscosity from about 65 to about 130 Krebunits (KU), preferably from about 70 to about 110 KU, more preferably from about 75 to about 105 KU. While coalescence, degradation, and other factors (such as evaporation during use) can cause the viscosity to increase over time, it is preferable that the viscosity not increase beyond about 130 KU, preferably not beyond about 120 KU, more preferably not beyond about 115 KU, and in some cases not beyond about 110 KU.

The latexes and/or coating compositions containing the polymer particles according to the invention can advantageously exhibit a pH from about 6 to about 10, although the pH needs only to be sufficient to maintain the stability of the particular latex and/or stain composition in combination with the surface-active agent(s) and other stabilizing components.

Another aspect of the invention relates to coated substrates. In one embodiment, the coated substrate comprises a coating composition according to the invention disposed on a substrate. In another embodiment, the coated substrate comprises a substrate and a coating disposed thereon, which coating is made from a coating composition comprising polymer particles in a latex according to the invention, water, an organic solvent, a surface-active agent, a defoamer, one or more (and preferably at least two) UV protectants, optionally a pH adjustor, optionally a rheology modifier, and optionally a biocide or preservative.

In another aspect of the invention, the latex containing the polymer particles according to the invention is advantageously created using a sequential polymerization method for the desired monomer(s). A conventional acrylic latex polymerization typically involves a single charge of monomer that is introduced/emulsified, initiated, and polymerized to form acrylic polymer particles. The polymer particles according to the invention can be polymerized conventionally, in one embodiment. In another embodiment, the polymer particles according to the invention may be polymerized sequentially. In other embodiments, the polymer particles according to the invention can be polymerized according to one or more of the methods described in commonly-owned co-pending U.S. patent applications, entitled "Polymers With Improved Shelf Stability," filed Nov. 30, 2005 as U.S. patent application Ser. No. 11/290,667, and entitled "Emulsion Polymers Having Multimodal Molecular Weight Distributions," filed on even date herewith. These patent applications are incorporated by reference herein in their entireties.

EXAMPLES

The following Examples are merely illustrative of certain embodiments of the invention and contain comparisons of compositions and methods according to the invention with the prior art and/or embodiments not according to the invention. The following Examples are not meant to limit the scope and breadth of the present invention, as recited in the appended claims.

Example 1

Wood Stain Compositions Containing Various Types of UV Protectants

The wood stain of Example 1 (with only trans-oxide type UV protectants) was formulated by combining the approximate proportions of the following ingredients in Table 1 below, using relatively high-shear mixing. The wood stain according to Example 1 can advantageously be a transparent (and translucent) coating composition according to the invention.

TABLE 1

| Ingredients | Parts by weight |
| --- | --- |
| Acrylic Latex 195* | 212 |
| TEXANOL ™ ester-alcohol solvent | 4 |
| ARCHER ™ RC solvent | 4 |
| POLYPHASE ™ AF-1 biocide | 5 |
| AEROSOL ™ OT (75% solids) wetting agent | 0.6 |
| FOAMASTER ™ V defoamer | 0.7 |
| TIMBASOL ™ PW-895 Trans-Oxide Yellow Dispersion | 6.4 |
| TIMBASOL ™ PW-896 Trans-Oxide Red Dispersion | 1.5 |
| Water | 184 |
| ACRYSOL ™ RM-825 rheology modifier | 0.75 |

*Acrylic Latex 195 is a latex containing polymer particles made from about 96.3 wt% n-butyl methacrylate monomer, about 0.6 wt% methacrylic acid monomer, and about 3.1 wt% Sipomer ™ WAM-II monomer.

To two different samples, 1a and 1b, comprising about 100 parts of the wood stain of Example 1, were added:

(1a) about 0.41 parts TINUVIN™ 292 (a hindered amine light stabilizer, HALS commercially available from CIBA®) and about 0.69 parts TINUVIN™ 1130 (a hydroxyphenyl-benzotriazole UV absorber, commercially available from CIBA®); and (1b) about 2.1 parts BYK™ LPX 20634 (a 50%-solids, UV-protective zinc oxide dispersion, commercially available from BYK Chemie USA, Inc.).

Red cedar wood panels having dimensions of about 2¾ in.×about 6 in. wide and about ⅛ to about ⅜ in. thick were coated using the wood stain compositions of Example 1 (as is), Example 1a (with a HALS and a UV absorber), and Example 1b (with a UV-protective zinc oxide). The coated wood panels were allowed to dry for about one week. The coated wood panels were subjected to accelerated weathering in constant ultraviolet light with alternating wet (about 30 minutes de-ionized water spray) and dry (about 90 minutes without water spray) cycles, for about 309 hours, using a Ci65A Xenon Arc Weather-Ometer®. Before and after accelerated weathering the three coated wood panels were removed and rated for wear and coating erosion. Wear and coating erosion are rated visually, using a scale from 0 (coating completely worn away) to 10 (coating appears same as original, pre-weathering coating). Sheen, which is coating gloss measured at a reflected angle of about 85°, expressed as the percent of reflected light, was also measured before and after accelerated weathering using a BYK Gardner Micro-TRI Gloss Meter. The results of the sheen and wear tests are shown below in Table 2.

TABLE 2

| Example # | Wear/Erosion Visual Rating (0 to 10) | Sheen (% reflected light) [Weathered/Unweathered] |
|---|---|---|
| 1 | 2 | 4.6/11.5 |
| 1a | 7 | 3.5/9.8 |
| 1b | 9 | 12.6/10.2 |

A higher sheen value after accelerated weathering typically indicates that more of the wood stain coating composition remains to reflect light. Based on the accelerated weathering results shown in Table 2, the addition of UV-protective zinc oxide (Example 1b) to a coating already comprising trans-oxide UV protectants markedly improved both wear and sheen characteristics. Addition of two TINUVIN™ UV protectants (Example 1a) to a coating already comprising trans-oxide UV protectants improved wear characteristics but reduced sheen. As can be seen by Example 1, a coating comprising only trans-oxide UV protectants had relatively poor wear and sheen characteristics in comparison.

Example 2

Wood Stain Compositions Containing Various Types of UV Protectants

The wood stain of Example 2 (with only trans-oxide type UV protectants) was formulated by combining the approximate proportions of the following ingredients in Table 3 below, using relatively high-shear mixing.

TABLE 3

| Ingredients | Parts by weight |
|---|---|
| JONREZ ® IC-2886 Styrene-Acrylic Emulsion* | 212 |
| TEXANOL ™ ester-alcohol solvent | 4 |
| ARCHER ™ RC solvent | 4 |
| POLYPHASE ™ AF-1 biocide | 5 |
| AEROSOL ™ OT (75% solids) wetting agent | 0.6 |
| FOAMASTER ™ V defoamer | 0.7 |
| TIMBASOL ™ PW-895 Trans-Oxide Yellow Dispersion | 6.4 |
| TIMBASOL ™ PW-896 Trans-Oxide Red Dispersion | 1.5 |
| Water | 184 |
| ACRYSOL ™ RM-825 rheology modifier | 0.75 |

*JONREZ ® IC-2886 is a styrene-acrylic emulsion commercially available from Mead-Westvaco Corporation.

To three different samples, 2a, 2b, and 2c, comprising about 100 parts of the wood stain of Example 2, were added:

(2a) TINUVIN™ 292 (a HALS commercially available from CIBA®) in such an amount as to encompass about 1.6% of solids and TINUVIN™ 1130 (a hydroxyphenylbenzotriazole UV absorber, commercially available from CIBA®) in such an amount as to encompass about 2.7% of solids;

(2b) BYK™ LPX 20634 (a 50%-solids, UV-protective zinc oxide dispersion, commercially available from BYK Chemie USA, Inc.) in such an amount as to encompass about 4% of solids; and (2c) BYK™ LPX 20634 in such an amount as to encompass about 8% of solids.

As in Example 1, red cedar wood panels having dimensions of about 2¾ in.×about 6 in. wide and about ⅛ to about ⅜ in. thick were coated using the wood stain compositions of Example 2 (as is), Example 2a (with about 4% combined solids from a HALS and a UV absorber), Example 2b (with about 4% combined solids from a UV-protective zinc oxide), and Example 2c (with about 8% combined solids from a UV-protective zinc oxide). The coated wood panels were allowed to dry for about one week. The coated wood panels were subjected to accelerated weathering similar to Example 1. Before and after accelerated weathering the four coated wood panels were removed and rated for wear and coating erosion. Wear and coating erosion are rated visually and sheen, is also measured before and after accelerated weathering similar to Example 1. The results of the sheen and wear tests are shown below in Table 4.

TABLE 4

| Example # | Wear/Erosion Visual Rating (0 to 10) | Sheen (% reflected light) [Weathered/Unweathered] |
|---|---|---|
| 2 | 2 | 2.3/6.1 |
| 2a | 2 | 3.4/5.3 |
| 2b | 8 | 8.0/3.0 |
| 2c | 7 | 13.0/9.2 |

A higher sheen value after accelerated weathering typically indicates that more of the wood stain coating composition remains to reflect light. Based on the accelerated weathering results shown in Table 4, the addition of UV-protective zinc oxide (Examples 2b and 2c) to a coating already comprising trans-oxide UV protectants markedly improved wear characteristics and improved sheen at higher solids content (Example 2c). Addition of two TINUVIN™ UV protectants (Example 2a) to a coating already comprising trans-oxide UV protectants did not measurably improve wear characteristics but slightly improved sheen. As can be seen by Example 2, a coating comprising only trans-oxide UV protectants had relatively poor wear and sheen characteristics in comparison.

The post-weathering sheen values for Examples 2b and 2c are higher, compared to the pre-weathered samples and seem to be relatively proportionally greater as the UV-protective zinc oxide content increases. Compositions containing trans-oxide alone (Example 2) and containing trans-oxide plus two TINUVIN™ UV protectants (Example 2a) show decreased sheen. Without being bound by theory, these results seem to indicate that the compositions containing UV-protective zinc oxide exhibit post-weathering surfaces that are somehow smoother than the unweathered surfaces, although the possible mechanism for such smoothing is not yet known.

Example 3

Wood Stain Compositions Containing Various Types of UV Protectants

The wood stain of Example 3 (without any UV protectants) was formulated by combining the approximate proportions of the following ingredients in Table 5 below, using relatively high-shear mixing.

TABLE 5

| Ingredients | Parts by weight |
| --- | --- |
| Benjamin Moore ™ 80-110 WR alkyd resin* | 79 |
| Cobalt NUXTRA ™ (12%) drier | 1.5 |
| Zirconium NUXTRA ™ (24%) drier | 1.5 |
| Calcium NUXTRA ™ (10%) drier | 1.5 |
| DRI~RX ™ drier | 0.7 |
| ARCOSOLV ™ PNB solvent | 7.9 |
| DEHYDRAN ™ 1620 defoamer | 0.6 |
| Ammonium hydroxide (28-30%) pH adjuster | 4.7 |
| Water | 103 |
| Acrylic latex 195** | 296 |
| TEXANOL ™ ester-alcohol solvent | 15.8 |
| Water | 301 |

*Benjamin Moore ™ 80-110 WR is a water reducible alkyd resin obtained from Benjamin Moore and was used in lieu of trans-oxide UV protectants.
**Acrylic latex 195 is a latex containing polymer particles made from about 96.3 wt% n-butylmethacrylate monomer, about 0.6 wt0/o methacrylic acid monomer, and about 3.1 wt % Sipomer ™ WAM-II monomer.

To four different samples, 3a through 3d, comprising about 100 parts of the wood stain of Example 3, were added:

(3a) about 0.42 parts TINUVIN™ 292 (a HALS commercially available from CIBA®) and about 0.71 parts TINUVIN™ 1130 (a hydroxyphenylbenzotriazole UV absorber, commercially available from CIBA®);

(3b) about 2.1 parts BYK™ LPX 20634 (a 50%-solids, UV-protective zinc oxide dispersion, commercially available from BYK Chemie USA, Inc.);

(3c) about 0.42 parts TINUVIN™ 292, about 0.71 parts TINUVIN™ 1130, and about 2.1 parts BYK™ LPX 20634; and (3d) about 2.1 parts Rhodigard™ W200+ (a 50%-solids, UV-protective cerium oxide dispersion, commercially available from Rhodia).

As in Example 1, red cedar wood panels having dimensions of about 2¾ in.×about 6 in. wide and about ⅛ to about ⅜ in. thick were coated using the wood stain compositions of Example 3 (no UV protectants), Example 3a (containing a HALS and a UV absorber), Example 3b (containing a UV-protective zinc oxide), Example 3c (containing a HALS, an organic UV absorber, and a UV-protective zinc oxide), and Example 3d (containing a UV-protective cerium oxide). The coated wood panels were allowed to dry for about one week. The coated wood panels were subjected to about 716 hours of accelerated weathering. Before and after accelerated weathering the five coated wood panels were removed and rated for wear and coating erosion. Wear and coating erosion were rated visually, as in Example 1. Color change between the pre-weathered coated panels and the post-weathering coated panels was measured using a Datacolor™ SF 600 spectrophotometer to measure reflected color according to the CIELAB color system using a D65 illuminant and 10° observer conditions. ΔE, or total color change, was measured on the same areas before and after weathering and was calculated as the square root of the sum of the squares of the differences in color variables a, b, and L. The results of the wear tests and color change analyses are shown below in Table 6.

TABLE 5

| Example # | Wear/Erosion Visual Rating (0 to 10) | Total Color Change (ΔE) |
| --- | --- | --- |
| 3 | 2 | 14.2 |
| 3a | 4 | 6.7 |
| 3b | 2 | 8.3 |
| 3c | 4 | 4.6 |
| 3d | 5 | 6.0 |

Based on the accelerated weathering results shown in Table 6, the presence of a combination of UV-protective zinc oxide, a HALS, and an organic UV absorber (Example 3c) shows the best (lowest) total color change, while the presence of UV-protective cerium oxide alone (Example 3d) shows the best (most highly-rated) wear characteristics.

Comparing these results to those in Examples 1-2, the increased UV degradation seen in the absence of trans-oxide UV protectants in Example 3 highlights the desirability of using trans-oxides as UV protectants. In addition, the significant synergy of the combination of UV-protective oxides (e.g., zinc oxide) with trans-oxides as joint UV protectants can be emphasized by comparing the results in Table 6 with the results in Tables 2 and 4, above.

Example 4

Wood Stain Compositions Containing Various Types of UV Protectants

The wood stain of Example 4 was formulated by combining the approximate proportions of the following ingredients in Table 7 below, using relatively high-shear mixing. The wood stain according to Example 4 can advantageously be a transparent (and translucent) coating composition according to the invention.

TABLE 7

| Ingredients | Parts by weight |
| --- | --- |
| NEOCRYL ™ XK-90* | 98 |
| DEHYDRAN ™ 1620 defoamer | 0.14 |
| MICHEM ™ Emulsion 62230 wax emulsion | 9.3 |
| TEXANOL ™ ester-alcohol solvent | 3.5 |
| AEROSOL ™ OT (75% solids) wetting agent | 0.3 |
| Water | 75 |
| ACRYSOL ™ RM-825 rheology modifier | 1.5 |

*NEOCRYL ™ XK-90 is an acrylic latex commercially available from DSM NeoResins.

To eleven different samples, 4a through 4k, each comprising the master batch of the wood stain of Example 4 above, were added:

(4a) about 0.82 parts TINUVIN™ 292 (a hindered amine light stabilizer commercially available from CIBA®) and about 1.4 parts TINUVIN™ 1130 (a hydroxyphenylbenzotriazole UV absorber, commercially available from CIBA®);

(4b) about 2.2 parts BYK™ LP-X 20832 (a 50%-solids, UV-protective zinc oxide dispersion, commercially available from BYK Chemie USA, Inc.);

(4c) about 2.8 parts TIMBASOL™ PW-895 Trans-Oxide Yellow Dispersion (a transparent yellow iron oxide UV protectant dispersion, commercially available from CIUPL) and about 2.2 parts BYK™ LP-X 20832;

(4d) about 2.8 parts TIMBASOL™ PW-895 Trans-Oxide Yellow Dispersion, about 0.82 parts TINUVIN™ 292, and about 1.4 parts TINUVIN™ 1130;

(4e) about 2.8 parts TIMBASOL™ PW-895 Trans-Oxide Yellow Dispersion, about 0.82 parts TINUVIN™ 292, about 1.4 parts TINUVIN™ 1130, and about 2.2 parts BYK™ LP-X 20832;

(4f) about 2.8 parts TIMBASOL™ PW-896 Trans-Oxide Red Dispersion (a transparent red iron oxide UV protectant dispersion, commercially available from CIUPL) and about 2.2 parts BYK™ LP-X 20832;

(4g) about 2.8 parts TIMBASOL™ PW-896 Trans-Oxide Red Dispersion, about 0.82 parts TINUVIN™ 292, and about 1.4 parts TINUVIN™ 1130;

(4h) about 2.8 parts TIMBASOL™ PW-895 Trans-Oxide Red Dispersion, about 0.82 parts TINUVIN™ 292, about 1.4 parts TINUVIN™ 1130, and about 2.2 parts BYK™ LP-X 20832;

(4i) about 2.8 parts TIMBASOL™ PW-895 Trans-Oxide Yellow Dispersion and about 2.8 parts TIMBASOL™ PW-896 Trans-Oxide Red Dispersion;

(4j) about 2.8 parts TIMBASOL™ PW-895 Trans-Oxide Yellow Dispersion, about 2.8 parts TIMBASOL™ PW-896 Trans-Oxide Red Dispersion, about 0.82 parts TINUVIN™ 292, and about 1.4 parts TINUVIN™ 1130; and (4k) about 2.8 parts TIMBASOL™ PW-895 Trans-Oxide Yellow Dispersion, about 2.8 parts TIMBASOL™ PW-896 Trans-Oxide Red Dispersion, and about 2.2 parts BYK™ LP-X 20832.

Red cedar wood panels having dimensions of about 2¾ in.×about 6 in. wide and about ⅛ to about ⅜ in. thick were coated using the wood stain compositions of Examples 4 and 4a-4k. The coated wood panels were allowed to dry for about one week. The coated wood panels were subjected to accelerated weathering for about 409 hours. Before and after accelerated weathering, the twelve coated wood panels were removed and rated for wear and coating erosion. Wear and coating erosion were rated visually, as before, and the total color change between the pre-weathered coated panels and the post-weathering coated panels were measured as in Example 3. The results of the wear tests and color change analyses are shown below in Table 8.

TABLE 8

| Example # | Wear/Erosion Visual Rating (0 to 10) | Total Color Change (ΔE) |
|---|---|---|
| 4 | 3 | 8.5 |
| 4a | 5 | 6.8 |
| 4b | 1 | 23 |
| 4c | 5 | 11 |
| 4d | 5 | 10.4 |
| 4e | 7 | 8.6 |
| 4f | 7 | 11.9 |
| 4g | 6 | 9.6 |
| 4h | 7 | 8.6 |
| 4i | 6 | 11.6 |
| 4j | 8 | 10.7 |
| 4k | 8 | 10 |

A lower total color change, or ΔE value, upon accelerated weathering typically indicates that the wood stain coating composition offers better protection from UV degradation, as ultraviolet light typically degrades stained wood by altering the color. Based on the accelerated weathering results shown in Table 8, the best combination of wear and color change results can be seen in the combinations of multiple UV protectants, e.g., Examples 4e, 4h, and 4k. Example 4b shows that UV-protective zinc oxide does not perform well as the sole UV protectant in a wood stain composition. In contrast, Example 4k highlights the advantageous synergy of UV-protective oxides (e.g., zinc oxide) and transparent oxides (e.g., iron oxides), yielding low wear and low color change values. Furthermore, in Examples 4e and 4h, the advantageous synergy of UV-protective oxides (e.g., zinc oxide), transparent oxides (e.g., iron oxides), and other UV protectants (e.g., a HALS and a UV absorber) can also be seen in low wear and low color change values.

Example 5

Wood Stain Compositions Containing Various Types of UV Protectants

The wood stain of Example 5 (with multiple UV protectants) was formulated by combining the approximate proportions of the following ingredients in Table 9 below, using relatively high-shear mixing. The wood stain according to Example 5 can advantageously be a transparent (and translucent) coating composition according to the invention.

TABLE 9

| Ingredients | Parts by weight |
|---|---|
| NEOCRYL ™ XK~90* | 98 |
| AQUABEAD ™ AB-5 1 9** | 1.2 |
| DEHYDRAN ™ 1620 defoamer | 0.14 |
| MICHEM ™ Emulsion 62230 wax emulsion | 9.3 |
| TEXANOL ™ ester-alcohol solvent | 3.5 |
| TINUVIN ™ 292 UV protectant | 0.8 |
| TINUVTh4 ™ 1130 UV protectant | 1.4 |
| AEROSOL ™ OT (75% solids) wetting agent | 0.3 |
| FOAMASTER ™ V defoamer | 0.4 |
| TIMBASOL ™ PW-895 Trans-Oxide Yellow Dispersion | 3.0 |
| TIMBASOL ™ PW-896 Trans-Oxide Red Dispersion | 0.7 |
| Water | 75 |
| ACRYSOL ™ RM-825 rheology modifier | 1.8 |

*NEOCRYL ™ XK-90 is an acrylic latex commercially available from DSM NeoResins.
**AQUABEAD ™ AB-519 is a polymeric/oligomeric wax available from Micro Powders, Inc.

To four different samples, 5a through 5d, each comprising the master batch of the wood stain of Example 5 above, were added:

(5a) about 1.1 parts BYK™ LP-X 20832 (a 50%-solids, UV-protective zinc oxide dispersion, commercially available from BYK Chemie USA, Inc.);

(5b) about 2.2 parts BYK™ LP-X 20832;

(5c) about 1.9 parts NYACOL™ DP-5370 (a 30%-solids, UV-protective zinc oxide dispersion, commercially available from Nyacol Nano Technologies, Inc.); and (5d) about 3.7 parts NYACOL™ DP-5370.

Red cedar wood panels having dimensions of about 2¾ in.×about 6 in. wide and about ⅛ to about ⅜ in. thick were coated using the wood stain compositions of Examples 5 and 5a-5d. The coated wood panels were allowed to dry for about one week. The coated wood panels were subjected to accelerated weathering. Before and after accelerated weathering for about 672 hours, the five coated wood panels were removed and rated for wear and coating erosion. Wear and coating erosion are rated visually, as before, and the total color change was measured and expressed as ΔE. The results of the wear tests and color change analyses are shown below in Table 10.

TABLE 10

| Example # | Wear/Erosion Visual Rating (0 to 10) | Total Color Change (ΔE) |
|---|---|---|
| 5 | 3 | 13.8 |
| 5a | 8 | 8.8 |
| 5b | 9 | 4.4 |
| 5c | 5 | 8.5 |
| 5d | 7 | 7.6 |

A lower total color change, or ΔE value, upon accelerated weathering typically indicates that the wood stain coating composition offers better protection from UV degradation, as ultraviolet light typically degrades stained wood by altering the color. Based on the accelerated weathering results shown in Table 10, the best combination of wear and color change results are apparent when using UV-protective zinc oxide from Byk Chemie, e.g., Examples 5a-5b. Although the wood stain compositions comprising UV-protective zinc oxide from Nyacol (Examples 5c-5d) performed better than those without UV-protective zinc oxide (Example 5), it appears that some UV-protective zinc oxide is better than others. Example 5b highlights the advantageous synergy of certain UV-protective oxides (e.g., zinc oxide from Byk Chemie) with transparent oxides (e.g., iron oxides), and other UV protectants (e.g., a HALS and a UV absorber), as shown by the extremely low wear and color change values.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A coating composition for depositing on a substrate to protect the substrate from ultraviolet degradation, which coating composition comprises:
    (a) a latex emulsion comprising polymer particles;
    (b) a UV-protective zinc oxide, or a UV-protective cerium oxide, or a combination thereof; and
    (c) at least one other UV protectant comprising
        (i) a transparent iron oxide, or
        (ii) a hindered amine light stabilizer, optionally in combination with an organic UV absorber, or
        (iii) both (i) and (ii);
    wherein the coating composition is a single composition.

2. The coating composition of claim 1, wherein the polymer particles are made from the following monomer repeat units: acrylic acid, ionic acrylate salts, alkacrylic acids, ionic alkacrylate salts, haloacrylic acids, ionic haloacrylate salts, polymerizable anhydrides, acrylamide, alkacrylamides, monoalkyl acrylamides, monoalkyl alkacrylamides, alkacrylamidoalkyl ethyleneureas, alkenyloxyamidoalkyl ethyleneureas, vinyl dicarboxylic organic acids, monoalkyl esters of vinyl dicarboxylic organic acids, monoisopropenyl esters of saturated vinyl dicarboxylic organic acids, alkyl acrylates, alkyl alkacrylates, alkyl esters of vinyl monocarboxylic organic acids other than acrylates and alkacrylates, dialkyl esters of vinyl dicarboxylic acids, styrene, alkylstyrenes, halostyrenes, isopropenyl esters of saturated monocarboxylic organic acids, monoisopropenyl monoalkyl esters of saturated dicarboxylic organic acids, vinyl carboxylate alkyl ethers, vinyl alkyl ethers, acrylonitrile, alkacrylonitriles, dialkyl acrylamides, dialkyl alkacrylamides, allyl compounds, hydroxyalkyl acrylates, hydroxyalkyl alkacrylates, vinyl phenols, hydroxyalkyl vinyl benzenes, only partially esterified acrylate esters of alkylene glycols, only partially esterified acrylate esters of non-polymeric polyhydroxy compounds like glycerol, only partially esterified acrylate esters of polymeric polyhydroxy compounds, butadienes, hexadienes, hexatrienes, octadienes, octatrienes, octatetrenes, hydrocarbon analogs of conjugated dienes, substituted halo-derivatives of conjugated dienes, substituted cyano-derivatives of conjugated dienes, and combinations thereof.

3. The coating composition of claim 2, wherein the polymer particles are substantially acrylic.

4. The coating composition of claim 2, wherein the polymer particles are substantially free from (a) hydroxy-functional pendant groups, or (b) conjugated dienes, or (c) both.

5. The coating composition of claim 1, wherein the at least one other UV protectant comprises (i) a transparent iron oxide.

6. The coating composition of claim 1, wherein the at least one other UV protectant comprises (ii) hindered amine light stabilizer and an organic UV absorber.

7. The coating composition of claim 5, wherein the at least one other UV protectant further comprises (ii) a hindered amine light stabilizer and an organic UV absorber.

8. The coating composition of claim 1, wherein the substrate is an opaque or semi-opaque substrate.

9. The coating composition of claim 1, wherein the substrate comprises wood, a metal, a ceramic, a transparent substrate, a translucent substrate, a polymer substrate, a woven fabric, a non-woven fabric, a chalky substrate, or a composite or combination thereof.

10. The coating composition of claim 1, wherein the coating composition is translucent or semi-transparent.

11. The coating composition of claim 1, wherein the coating composition is transparent.

12. The coating composition of claim 1, wherein the coating composition is substantially free from reacted and unreacted organosilanes.

13. A coated substrate comprising the coating composition of claim 1 disposed on the substrate.

14. A coating composition for depositing on a substrate to protect the substrate from ultraviolet degradation, which coating composition comprises:
    (a) a latex emulsion comprising polymer particles;
    (b) a first UV protectant comprising a UV-protective zinc oxide, or a UV-protective cerium oxide, or a combination thereof;
    wherein the coating composition is a single composition and is translucent or semi-transparent.

15. The translucent coating composition of claim 14, further comprising (c) at least one other UV protectant comprising
    (i) a transparent iron oxide, or
    (ii) a hindered amine light stabilizer, optionally in combination with an organic UV absorber, or
    (iii) both (i) and (ii).

16. The translucent coating composition of claim 15, wherein the at least one other UV protectant comprises (ii) a hindered amine light stabilizer and an organic UV absorber.

17. The translucent coating composition of claim 14, wherein the polymer particles are made from the following monomer repeat units: acrylic acid, ionic acrylate salts, alkacrylic acids, ionic alkacrylate salts, haloacrylic acids, ionic haloacrylate salts, polymerizable anhydrides, acrylamide, alkacrylamides, monoalkyl acrylamides, monoalkyl alkacrylamides, alkacrylamidoalkyl ethyleneureas, alkenyloxyamidoalkyl ethyleneureas, vinyl dicarboxylic organic acids, monoalkyl esters of vinyl dicarboxylic organic acids, monoisopropenyl esters of saturated vinyl dicarboxylic organic acids, alkyl acrylates, alkyl alkacrylates, alkyl esters of vinyl monocarboxylic organic acids other than acrylates and alkacrylates, dialkyl esters of vinyl dicarboxylic acids, styrene, alkylstyrenes, halo styrenes, isopropenyl esters of saturated monocarboxylic organic acids, monoisopropenyl monoalkyl esters of saturated dicarboxylic organic acids, vinyl carboxylate alkyl ethers, vinyl alkyl ethers, acrylonitrile, alkacrylonitriles, dialkyl acrylamides, dialkyl alkacrylamides, allyl compounds, hydroxyalkyl acrylates, hydroxyalkyl alkacrylates, vinyl phenols, hydroxyalkyl vinyl benzenes, only partially esterified acrylate esters of alkylene glycols, only partially esterified acrylate esters of non-polymeric polyhydroxy compounds like glycerol, only partially esterified acrylate esters of polymeric polyhydroxy compounds, butadienes, hexadienes, hexatrienes, octadienes, octatrienes, octatetrenes, hydrocarbon analogs of conjugated dienes, substituted halo-derivatives of conjugated dienes, substituted cyano-derivatives of conjugated dienes, and combinations thereof.

18. The translucent coating composition of claim 17, wherein the polymer particles are substantially acrylic.

19. The translucent coating composition of claim 17, wherein the polymer particles are substantially free from (a) hydroxy-functional pendant groups, or (b) conjugated dienes, or (c) both.

20. The translucent coating composition of claim 14, wherein the substrate is an opaque or semi-opaque substrate.

21. The translucent coating composition of claim 19, wherein the substrate comprises wood, a metal, a ceramic, a transparent substrate, a translucent substrate, a polymer substrate, a woven fabric, a non-woven fabric, a chalky substrate, or a composite or combination thereof.

22. The translucent coating composition of claim 14, wherein the coating composition is transparent.

23. The translucent coating composition of claim 14, wherein the coating composition is substantially free from reacted and unreacted organosilanes.

24. A UV protectant composition comprising:
(1) a first UV protectant comprising a UV-protective zinc oxide, or a UV-protective cerium oxide, or a combination thereof; and
(2) a second UV protectant comprising
  (i) a hindered amine light stabilizer, optionally in combination with an organic UV absorber, or
  (ii) a hindered amine light stabilizer, optionally in combination with an organic UV absorber, and a transparent iron oxide;
wherein the UV protectant composition is a single composition.

25. The UV protectant composition of claim 24, wherein the UV protectant composition is in a solid form.

26. The UV protectant composition of claim 24, wherein the UV protectant composition is in the form of a suspension, an emulsion, a latex, or a combination thereof.

27. A coating composition comprising:
(a) a latex emulsion comprising polymer particles; and
(b) the UV protectant composition of claim 24 disposed on a substrate to protect the substrate from ultraviolet degradation.

28. A coating composition for depositing on a substrate, which coating composition comprises:
(a) a latex emulsion comprising polymer particles in which a majority of the monomer repeat units are acrylic; and
(b) a UV-protective zinc oxide, or a UV-protective cerium oxide, or a combination thereof, to protect the substrate from ultraviolet degradation,
wherein the coating composition is a single composition and is substantially free from reacted and unreacted organosilanes, and
wherein the substrate is an opaque or semi-opaque substrate.

29. A coated substrate comprising the coating composition of claim 28 disposed on the substrate.

* * * * *

(12) EX PARTE REEXAMINATION CERTIFICATE (8641st)
United States Patent
Sheerin et al.

(10) Number: US 7,754,801 C1
(45) Certificate Issued: Oct. 25, 2011

(54) TRANSLUCENT COATING COMPOSITIONS PROVIDING IMPROVED UV DEGRADATION RESISTANCE

(75) Inventors: Robert J. Sheerin, North Caldwell, NJ (US); Navin Tilara, Roseland, NJ (US); Hrire Gharapetian, Ridgewood, NJ (US); David L. Siegfried, Langhorne, PA (US)

(73) Assignee: Columbia Insurance Company, Omaha, NE (US)

Reexamination Request:
No. 90/011,257, Sep. 24, 2010

Reexamination Certificate for:
Patent No.: 7,754,801
Issued: Jul. 13, 2010
Appl. No.: 11/323,616
Filed: Dec. 30, 2005

(51) Int. Cl.
*C08K 3/022* (2006.01)

(52) U.S. Cl. .................. 524/432; 524/236; 524/435; 524/555; 524/556; 524/571

(58) Field of Classification Search ............ None
See application file for complete search history.

(56) References Cited

U.S. PATENT DOCUMENTS

| 5,340,567 A | 8/1994 | Cole et al. |
| 5,553,630 A | 9/1996 | Dupuis et al. |
| 6,214,416 B1 | 4/2001 | Sakagami et al. |
| 6,337,362 B1 | 1/2002 | Reynolds et al. |

FOREIGN PATENT DOCUMENTS

| JP | 61-261332 | 11/1986 |
| JP | 6-346018 | 12/1994 |
| WO | WO-2005-005114 | 1/2005 |

OTHER PUBLICATIONS

Brainard, David H., "Color Appearance and Color Difference Specification," Chapter 5, from The Science of Color, 2003, pp. 191–216, Elsevier Ltd.

*Primary Examiner* — Jerry D. Johnson

(57) ABSTRACT

The present invention relates to substrates and coating compositions disposed thereon containing improved ultraviolet degradation resistance. Specifically, these coating compositions can contain multiple UV protectants and can advantageously be used in transparent, semi-transparent, and/or translucent coatings on substrates, particularly opaque or semi-opaque substrates such as wood, e.g., in order to inhibit, to reduce, and/or to minimize UV degradation of said substrates.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5, 15, 16, 18 and 24-28 are cancelled.

Claims 1, 6, 7, 14, 17 and 29 are determined to be patentable as amended.

Claims 2-4, 8-13 and 19-23, dependent on an amended claim, are determined to be patentable.

New claims 30-33 are added and determined to be patentable.

1. A coating composition for depositing on a substrate to protect the substrate from ultraviolet degradation, which coating composition comprises:
   (a) a latex emulsion comprising polymer particles;
   (b) a *first UV protectant comprising a* UV-protective zinc [oxide] *nano-oxide*, or a UV-protective cerium [oxide] *nano-oxide*, or a combination thereof; and
   (c) [at least one other] *a second* UV protectant comprising *at least*
      (i) a transparent iron oxide[, or
      (ii) a hindered amine light stabilizer, optionally in combination with an organic UV absorber, or
      (iii) both (i) and (ii)];
   *wherein the ratio of the first UV protectant to the second UV protectant is about 0.17:1 to about 15.75:11 and wherein the coating composition is a single composition.*

6. The coating composition of claim 1, wherein the [at least one other] *second* UV protectant *further* comprises (ii) hindered amine light stabilizer [in combination with] *or* an organic UV absorber.

7. The coating composition of claim [5] *6*, wherein the [at least one other] *second* UV protectant further comprises (ii) a hindered amine light stabilizer and an organic UV absorber.

14. A coating composition for depositing on a substrate to protect the substrate from ultraviolet degradation, which coating composition comprises:

(a) a latex emulsion comprising polymer particles, *wherein the polymer particles comprise acrylic particles and alkyd particles*;
   b) a first UV protectant comprising a UV-protective zinc [oxide] *nano-oxide*, or a UV-protective cerium [oxide] *nano-oxide*, or a combination thereof, and
   (c) *a second UV protectant comprising a hindered amine light stabilizer and an organic UV absorber,* wherein the coating composition is a single composition and is translucent or semi-transparent.

17. The translucent coating composition of claim 14, wherein the [polymer] *acrylic* particles are made from the following monomer repeat units: acrylic acid, ionic acrylate salts, alkacrylic acids, ionic alkacrylate salts, haloacrylic acids, ionic haloacrylate salts, [polymerizable anhydrides,] acrylamide, alkacrylamides, monoalkyl acrylamides, monoalkyl alkaracrylamides, [alkacrylamidoalkyl ethyleneureas, alkenyloxyamidoalkyl ethyleneureas, vinyl dicarboxylic organic acids, monoalkyl esters of vinyl dicarboxylic organic acids, monoisopropenyl esters of saturated vinyl dicarboxylic organic acids,] alkyl acrylates, alkyl alkacrylates, [alkyl esters of vinyl monocarboxylic organic acids other than acrylates and alkacrylates, dialkyl esters of vinyl dicarboxylic acids, styrene, alkylstyrenes, halostyrenes, isopropenyl esters of saturated monocarboxylic acids, monoisopropenyl monoalkyl esters of saturated dicarboxylic organic acids, vinyl carboxylate alkyl ethers, vinyl alkyl ethers,] acrylonitrile, alkacrylonitriles, dialkyl acrylamides, dialkyl alkacrylamides, [allyl compounds,] hydroxyalkyl acrylates, hydroxyalkyl alkacrylates, [vinyl phenols, hydroxyalkyl vinyl benzenes,] only partially esterified acrylate esters of alkylene glycols, only partially esterified acrylate esters of non-polymeric polyhydroxy compounds like glycerol, only partially esterified acrylate esters of polymeric polyhydroxy compounds, [butadienes, hexadienes, hexatrienes, octadienes, octatrienes, octatetrenes, hydrocarbon analogs of conjugated dienes, substituted halo-derivatives of conjugated dienes, substituted cyano-derivatives of conjugated dienes,] and combinations thereof.

29. A coated substrate comprising the coating composition of claim [28] *14* disposed on the substrate.

*30. The coating composition of claim 1, wherein said ratio is about 0.17:1 to about 7.19:1.*

*31. The coating composition of claim 30, wherein said ratio is about 0.17:1 to about 1.74:1.*

*32. The coating composition of claim 30, wherein said ratio is about 0.17:1 to about 1.23:1.*

*33. The coating composition of claim 14 wherein the ratio of the first UV protectant to the second UV protectant is about 1:1.*

* * * * *